United States Patent
Brück

(10) Patent No.: US 11,549,421 B2
(45) Date of Patent: Jan. 10, 2023

(54) APPARATUS AND METHOD FOR HEATING A DEVICE FOR EXHAUST GAS AFTER-TREATMENT

(71) Applicant: Vitesco Technologies GmbH, Hannover (DE)

(72) Inventor: Rolf Brück, Schwalbach a. Ts. (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 195 days.

(21) Appl. No.: 16/960,982

(22) PCT Filed: Jan. 9, 2019

(86) PCT No.: PCT/EP2019/050369
§ 371 (c)(1),
(2) Date: Jul. 9, 2020

(87) PCT Pub. No.: WO2019/137926
PCT Pub. Date: Jul. 18, 2019

(65) Prior Publication Data
US 2020/0332695 A1    Oct. 22, 2020

(30) Foreign Application Priority Data

Jan. 12, 2018 (DE) ............ 10 2018 200 464.1

(51) Int. Cl.
*F01N 3/28* (2006.01)
*F01N 3/20* (2006.01)

(52) U.S. Cl.
CPC ........... *F01N 3/281* (2013.01); *F01N 3/2013* (2013.01); *F01N 2240/16* (2013.01);
(Continued)

(58) Field of Classification Search
CPC ... F01N 3/2013; F01N 3/2026; F01N 2240/16
See application file for complete search history.

(56) References Cited

U.S. PATENT DOCUMENTS

| 4,975,099 A | 12/1990 | Kaser et al. |
| 5,345,761 A | 9/1994 | King et al. |

(Continued)

FOREIGN PATENT DOCUMENTS

| CN | 101111714 | 1/2008 |
| CN | 101306685 | 11/2008 |

(Continued)

OTHER PUBLICATIONS

Machine translation of DE4132439A1, accessed Jun. 3, 2022. (Year: 2022).*

(Continued)

*Primary Examiner* — Jonathan R Matthias
(74) *Attorney, Agent, or Firm* — Cozen O'Connor

(57) ABSTRACT

An apparatus for heating an exhaust gas after-treatment unit in a vehicle has, as a drive source, both a combustion engine and an electric motor. The apparatus includes: a honeycomb body configured for exhaust gas to flow therethrough, the honeycomb body having a hollow, through which hollow the exhaust gas flows; and at least one electric heating element arranged in the hollow so as to heat the honeycomb body. The honeycomb body includes a plurality of metal foils stacked one on top of the other, which metal foils form between them a plurality of flow channels, through which a flow can pass along an axial direction, wherein the hollow of the honeycomb body extends in a radial direction, in which the at least one heating element is accommodated.

15 Claims, 2 Drawing Sheets

(52) U.S. Cl.
CPC ...... *F01N 2330/02* (2013.01); *F01N 2330/30* (2013.01); *F01N 2590/11* (2013.01)

(56) References Cited

U.S. PATENT DOCUMENTS

| | | | |
|---|---|---|---|
| 5,562,885 | A | 10/1996 | Bayer et al. |
| 2008/0170972 | A1* | 7/2008 | Cai .................... B01D 53/9454 422/177 |
| 2008/0295493 | A1 | 12/2008 | Applegate et al. |
| 2017/0016370 | A1* | 1/2017 | Schlipf .................... H05B 3/48 |
| 2018/0023442 | A1* | 1/2018 | Baensch .................... F01N 3/28 60/286 |
| 2018/0266349 | A1 | 9/2018 | Almkvist |

FOREIGN PATENT DOCUMENTS

| | | |
|---|---|---|
| CN | 101678827 | 3/2010 |
| CN | 101881207 | 11/2010 |
| CN | 102003258 | 4/2011 |
| CN | 102498269 | 6/2012 |
| CN | 107002539 | 8/2017 |
| CN | 107152327 | 9/2017 |
| DE | 41 32 439 | 4/1993 |
| DE | 43 22 037 | 1/1995 |
| DE | 44 34 673 | 4/1996 |
| DE | 196 40 577 | 4/1997 |
| DE | 694 14 816 | 5/1999 |
| DE | 100 56 279 | 5/2002 |
| DE | 102 37 512 | 11/2003 |
| DE | 20 2005 007 243 | 8/2005 |
| DE | 10 2004 046 918 | 3/2006 |
| DE | 10 2010 035 480 | 3/2011 |
| EP | 0 233 860 | 8/1987 |
| EP | 0465183 | 1/1992 |
| JP | H 04-81509 | 3/1992 |
| JP | H 06-137140 | 5/1994 |
| JP | H 07-500052 | 1/1995 |
| JP | H 08-326526 | 12/1996 |
| JP | 2818477 B2 | 10/1998 |
| JP | 2008014186 | 1/2008 |
| JP | 2010-202012 | 9/2010 |
| JP | 2010 203419 | 9/2010 |
| JP | 2013-147974 | 8/2013 |
| KR | 100225194 | 10/1999 |

OTHER PUBLICATIONS

Office Action dated Apr. 30, 2021 issued in Japanese Patent Application No. 2020-538709.
International Search Report issued in corresponding PCT Application PCT/EP2019/050369.
Written Opinion issued in corresponding PCT Application PCT/EP2019/050369.
Office Action issued in corresponding German Application No. 10 2018 200 464.1.
Office Action dated Jun. 29, 2021 issued in Chinese Patent Application No. 201980007220.8.
Office Action dated May 31, 2022, issued in Chinese Patent Application No. 201980007220.8.
Office Action dated Jan. 4, 2022 issued in Korean Patent Application No. 10-2020-7022749.
Office Action dated Feb. 16, 2022 issued in Chinese Patent Application No. 201980007220.8.

* cited by examiner

APPARATUS AND METHOD FOR HEATING A DEVICE FOR EXHAUST GAS AFTER-TREATMENT

CROSS REFERENCE TO RELATED APPLICATIONS

This is a U.S. national stage of International application No. PCT/EP2019/050369, filed on Jan. 9, 2019, which claims priority to German Application No. 10 2018 200 464.1, filed Jan. 12, 2018, the content of each of which is incorporated herein by reference.

BACKGROUND OF THE INVENTION

1. Field of the Invention

The invention relates to an apparatus for heating an exhaust gas after-treatment unit in a vehicle.

2. Description of the Prior Art

It is known that a large part of the pollution caused by combustion engines is produced in the "cold starting phase", when the components provided for exhaust gas after-treatment have not yet reached their actually envisaged operating temperature. The planned treatment and chemical conversion of the exhaust gas into harmless end products takes place to only a limited extent in these phases.

The prior art therefore includes, for example, heated catalytic converters, which are heated electrically using the ohmic resistance in order to achieve the temperature required for operation earlier. For this purpose, there are, for example, heating disks through which there pass heating conductors and through which the exhaust gas can flow and which thus lead to heating of the exhaust gas stream, as a result of which the catalytic converter actually provided for chemical conversion can likewise be brought to its envisaged operating temperature earlier without additional heating.

The apparatuses previously known in the prior art for heating components for exhaust gas after-treatment are provided predominantly for use in vehicles driven exclusively by a combustion engine. However, the problems of increased exhaust emissions, which are associated with cold starting, occur also and precisely with hybrid vehicles, which, besides the drive involving a combustion engine, also have an electric drive. Particularly in the case of vehicles which can be driven purely electrically, there are increased stoppage times of the combustion engine, for which reason the proportion of the total operating duration accounted for by the cold starting phase is increased in comparison with vehicles operated exclusively by a combustion engine. Hitherto, the prior art has not disclosed any apparatuses and methods which bring about a targeted amelioration of these problems.

SUMMARY OF THE INVENTION

An object of the present invention is therefore to provide an apparatus and a method for heating a device for exhaust gas after-treatment which, particularly in the case of hybrid vehicles, achieves a reliable reduction in the emissions figures, which are increased in cold starting phases.

The object relating to the apparatus for heating may be achieved by an apparatus for heating an exhaust gas after-treatment unit in a vehicle which, in addition to a combustion engine, also comprises an electric motor as a drive source, wherein at least one electric heating element is provided, which, in order to heat a honeycomb body through which exhaust gas can flow, is arranged in a cavity formed in the honeycomb body, wherein the honeycomb body is formed from a plurality of metal foils stacked one on top of the other, which metal foils form between them a plurality of flow channels, through which a flow can pass along an axial direction, wherein the honeycomb body has a hollow extending in the radial direction, in which a heating element is accommodated.

The honeycomb body is preferably formed from metal foils, which have been stacked one on top of the other into a stack of layers, and have been inserted into a shell that forms the housing of the honeycomb body. Another advantageous possibility is to wind up or roll up the stack of layers in order to produce a honeycomb body appropriate for the intended use.

The hollow for accommodating the heating element is preferably formed in the radial direction of the honeycomb body and extends from the outer circumference thereof, which is defined by the shell, toward the center, formed by the center line of the honeycomb body, or even beyond that in the radial direction. The hollow is advantageously produced by piercing the individual metal foils used to produce the honeycomb body. For example, the metal foils can have slotted holes extending in the circumferential direction of the honeycomb body, which are arranged in such a way that the holes in the individual layers are superimposed when the stack of layers has been rolled up or wound up to form the honeycomb body.

The prior introduction of the holes into the metal foils is since it is thereby possible to produce a rectilinear advantageous hollow which extends from the outside inward in the radial direction without the need to employ a machining method on the already wound-up honeycomb body. Chips forming during this process could clog the honeycomb body or the flow channels formed by said body.

A heating element in the hollow of the honeycomb body can be used directly to heat the metal structure of the honeycomb body without necessarily requiring an exhaust gas stream to transfer the heat. The heating element can preferably be introduced into the hollow from the outside and secured on the shell surrounding the honeycomb body. The heating element can preferably emit its heat in the axial direction of the honeycomb body.

It is particularly advantageous if the heating element can be operated at a system voltage which is significantly above the onboard voltage available in a vehicle operated with a combustion engine, wherein, in particular, a system voltage of 230 volts is advantageous.

Heating elements in the exhaust line, e.g., the heating disk of a heated catalytic converter, are usually operated at the onboard voltage of the vehicle. This is generally 12 volts in vehicles operated with a combustion engine. Some hybrid vehicles have onboard electrical systems which are already being operated at 48 volts. In hybrid vehicles, a significantly higher onboard voltage of, in some cases, over 300 volts, is required to operate the electric motor as a drive source, for which reason the heating element can also be operated at a higher voltage. It is advantageous here that, in the case of a higher voltage, a desired power output can be produced even at relatively low current intensities.

It is also advantageous if, when viewed from the outside to the inside in the radial direction, the heating element has a region that is in contact with a shell that surrounds the honeycomb body, a thermal insulating region and a heating zone.

The thermal insulating region between the actual heating zone and the mounting region by which the heating element is secured on the shell is particularly necessary because heat transfer toward the shell and toward the outside of the honeycomb body can be selectively prevented or reduced. As a result, a larger proportion of the heat produced by the heating element is used to heat the actual honeycomb structure at which the chemical conversion of the exhaust gas takes place during operation.

The insulating region can be formed as an additional element consisting of an insulating material or, alternatively, can be formed as part of the mounting region itself by manufacturing this region from a thermally insulating material.

By providing a heating element in the honeycomb body, it is possible to achieve continuous temperature control of the honeycomb body, especially when the combustion engine is not being operated. The honeycomb body can thus be temperature-controlled during the purely electric driving mode, and therefore the temperature required for effective conversion of the exhaust gas is reached more quickly and thus the increased exhaust gas emissions resulting from the cold start are greatly reduced.

It is also preferred if a heating disk that can be heated electrically is positioned ahead of the honeycomb body in the flow direction of the exhaust gas. An additional heating disk ahead of the honeycomb body in the flow direction is advantageous to achieve more rapid heating, even in operation with a combustion engine, in that the exhaust gas has already been heated before flowing into the honeycomb body. By such a dual structure, it is possible to achieve rapid heating of the honeycomb body and thus more rapid effective exhaust gas conversion both in operation with a combustion engine and in operation with an electric motor.

Moreover, it is advantageous if the heating element in the honeycomb body and the heating disk positioned ahead of the honeycomb body can be heated independently of one another. This is advantageous to achieve the correct heating depending on the respectively selected operating mode. Hybrid operation of the heating disk and of the heating element can also be provided to further improve heating in operation with a combustion engine.

According to one aspect, the invention relates to a method for heating an exhaust gas after-treatment unit in a vehicle having at least one combustion engine and at least one electric motor as drive sources, wherein at least two different heating methods are used, wherein the respective heating method is selected according to the respective drive source being used to produce propulsion.

In purely electric-motor operation, no exhaust gases that could transfer the heat from the heating disk toward the honeycomb body are produced by the combustion engine. Heating of the honeycomb body by the heating disk would therefore not be very effective. It is therefore advantageous if the honeycomb body is heated directly by the heating element arranged therein. In operation with a combustion engine, heating of the honeycomb body can be accomplished in a conventional manner through the heating of the flowing exhaust gas by the heating disk.

It is furthermore advantageous if, when the combustion engine is being used as the drive source, the exhaust gas after-treatment unit is heated by the heating disk positioned ahead of the honeycomb body, wherein the exhaust gas stream flowing through the heating disk is heated by the heating disk, and the heated exhaust gas stream subsequently heats the honeycomb body. The exhaust gas is thus brought to a higher temperature level, for which reason also the honeycomb body is heated more quickly and the chemical conversion can take place more rapidly.

It is also expedient if, when the electric motor is being used as the drive source, the exhaust gas after-treatment unit is heated by the heating element arranged in the hollow of the honeycomb body. This is advantageous since the exhaust gas stream is not available as a transfer medium for the heat produced by the heating disk. The heating element in the honeycomb body can ensure continuous heating of the honeycomb body.

Moreover, it is advantageous if the heating element is heated with a voltage of approximately 230 volts or more, thereby achieving a power output of up to 300 watts, preferably 100 watts to 200 watts, even at low current intensities of 1 to 1.5 amps. Low current intensities are advantageous since the risk to people in the case of faults, e.g., short circuits, decreases. Furthermore, the power losses which arise are significantly reduced in comparison with the previously conventional voltage level.

It is furthermore expedient if the heating of the honeycomb body by the heating element takes place continuously for as long as the combustion engine is not being operated. This is advantageous in order at all times to keep the honeycomb body at a temperature level that allows rapid conversion of the exhaust gases if the combustion engine is reactivated. Depending on the application of the hybrid vehicle and the design of the power storage devices as well as the respective driving situation, the combustion engine may be activated suddenly. A honeycomb body which is already sufficiently preheated is therefore advantageous.

As a preferred option, active feedback control for operation of the heating elements may also be provided. The active feedback control may be performed, for example, taking into account additional input variables such as the outside temperature, the operational state of the combustion engine or the temperature of the honeycomb body. For regulation of the heating by the heating element, it is alternatively or additionally also possible for a PTC heating element to be provided or for the heating element itself to be designed as a PTC heating element.

It is also to be preferred if a controller for monitoring the vehicle is provided, which, depending on the respectively active drive source and the instantaneous driving situation, produces a prediction of the type of drive selected in future, wherein, in the event of an expected use of the combustion engine as the drive source, the heating of the honeycomb body by the heating element is started.

The controller can be an independent control device or can be implemented in a control device already present for some other purpose. Essentially, the controller monitors which drive source is currently being used for propulsion and the current driving situation of the vehicle. If appropriate, the controller furthermore acquires data from other systems situated in the vehicle, e.g., the navigation system. From these, the controller determines a prediction for the future as to which drive source will be used. If the use of the combustion engine appears probable, the heating element in the honeycomb body can be activated to ensure sufficient heating of the honeycomb body.

Depending on the size of the honeycomb body to be heated and on the possible power output of the heating element, the preheating time can be adapted. It is furthermore possible to provide special operating modes which, for example, ensure continuous heating of the honeycomb body in operation with an electric motor in order in this way to produce a sufficiently high operating temperature at the honeycomb body at all times.

It is also expedient if a preheating function is provided for the heating element, wherein the preheating function can be started by a timer or by an external control element, based on values acquired by a monitoring unit. It is particularly advantageous if the preheating function can be started by an app installed on a mobile communications device. For this purpose, data such as the movement profile of a user, the regular habits of the user, such as departure time in the morning or similar, can be taken into account by an app, for example, in order to start automatic heating, thus ensuring that the honeycomb body already has a sufficient temperature for exhaust gas after-treatment when the combustion engine is started.

Advantageous developments of the present invention are described in the following description of the figures.

BRIEF DESCRIPTION OF THE DRAWINGS

The invention will be explained in detail in the following on the basis of exemplary embodiments with reference to the drawings, in which.

DETAILED DESCRIPTION OF THE PRESENTLY PREFERRED EMBODIMENTS

Figure 1:
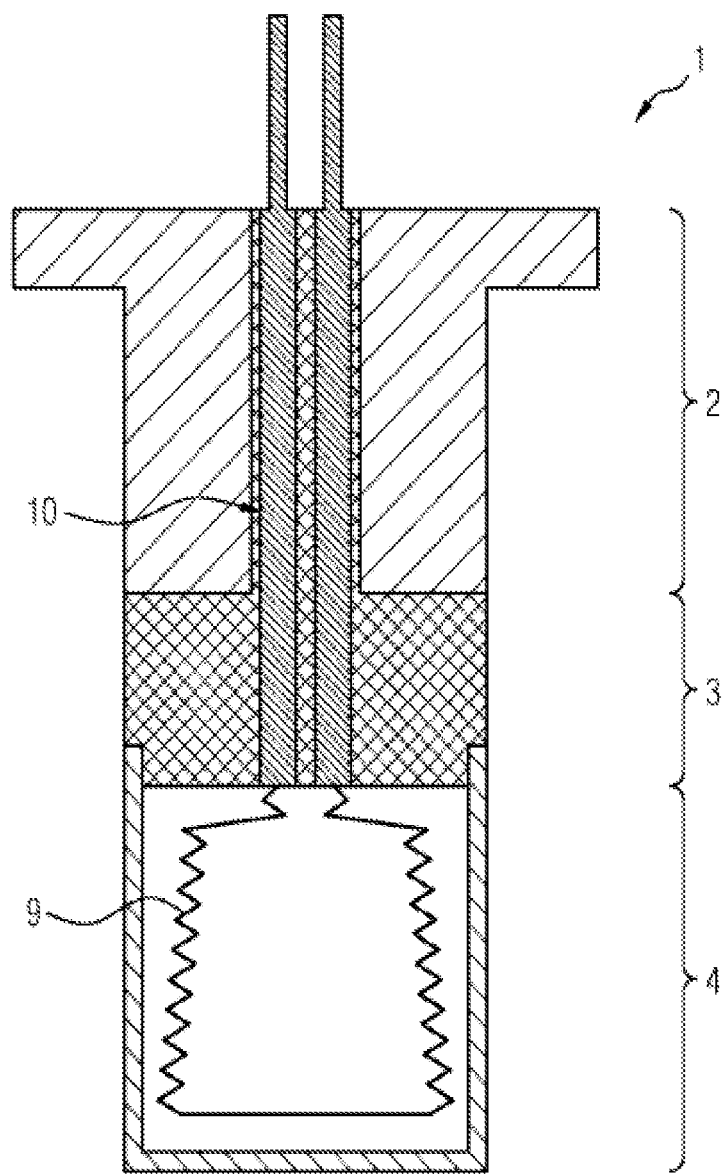
FIG. 1 shows a schematic sectional illustration through a heating element.

FIG. 1 shows a schematic sectional illustration through a heating element 1. The heating element 1 is divided into three regions. The "cold" end 2, which forms the mounting region of the heating element 1. By this region 2, the heating element 1 can be secured on the shell of a honeycomb body and thus positioned in a hollow of the honeycomb body.

Below this, region 3 illustrates a thermal insulating region, which produces thermal insulation between the heating region 4, illustrated below it, and the mounting region 2. The heating region 4 may also be referred to as a heating zone.

The entire heating element 1 is of pin-shaped design and can preferably be inserted into a honeycomb body in a radial direction. The thermal insulating region 3 reduces the heat released by the heating element 1 toward the mounting region 2, thereby simultaneously also reducing the heat losses toward the mounting region 2 and furthermore toward the outside of the honeycomb body. All the heat produced in the heating region 4 can therefore advantageously be released to the honeycomb structure of the honeycomb body, thereby achieving more effective heating overall.

The heating element 1 has an electric conductor 9, which is passed through the mounting region 2 and the thermal insulating region 3 into the heating region 4 through a channel-type structure 10 in the interior of the heating element 1. The electric conductor 9 is electrically insulated from the mounting region 2 and the thermal insulating region 3.

Figure 2:
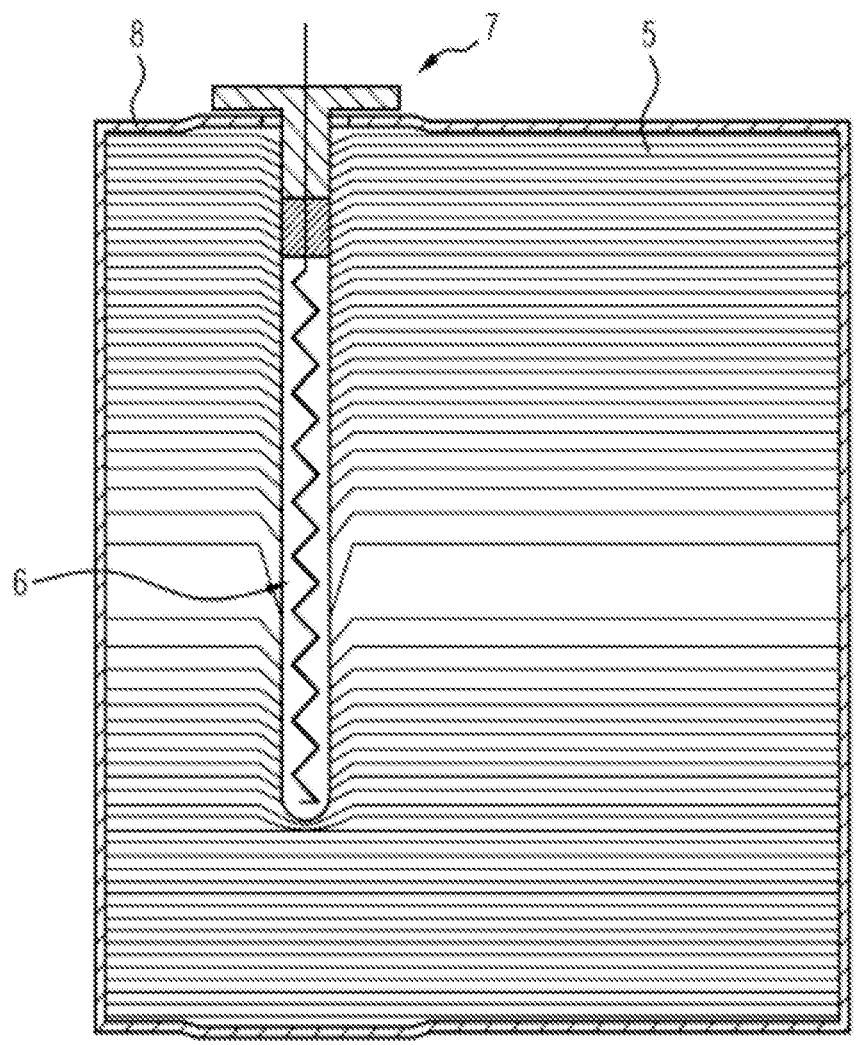
FIG. 2 shows a schematic sectional illustration through a honeycomb body having a heating element.

FIG. 2 shows a section through a honeycomb body 5 produced from stacked metal foils. In this case, the metal foils have holes which, in the fully assembled state, i.e., when the foil stack has been wound up to form the honeycomb body 5, are in line with one another and thus form the hollow 6 extending in the radial direction through the honeycomb body. The heating element 7 is inserted from the outside into this hollow 6.

Just as in the case of the heating element shown in FIG. 1, the heating element 7 has three regions, wherein, in particular, the mounting region, by which the heating element is secured on the shell 8 of the honeycomb body 5, is separated from the heating region by thermal insulation. The appropriate heating of the honeycomb body 5 is thereby achieved with the smallest possible heat losses.

The exemplary embodiments in FIGS. 1 and 2 are in particular not of a limiting nature, and serve for illustrating the concept of the invention.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. An apparatus for heating an exhaust gas after-treatment unit in a vehicle having, as a drive source, both a combustion engine and an electric motor, the apparatus comprising:
   a honeycomb body (5) configured for exhaust gas to flow therethrough, the honeycomb body (5) comprises:
      a plurality of metal foils stacked one on top of the other, which metal foils form between them a plurality of flow channels, through which a flow can pass along an axial direction; and
      a hollow (6) that extends radially through a first portion of the plurality of metal foils stacked one on top of the other; and
   at least one electric heating element (1, 7) arranged in the hollow (6) so as to heat the honeycomb body (5),
   wherein the hollow (6) of the honeycomb body (5) extends in a radial direction, in which the at least one heating element (1, 7) is accommodated,
   wherein a second portion of the plurality of metal foils stacked one on top of the other are not interrupted by the hollow.

2. The apparatus as claimed in claim 1, wherein the heating element (1, 7) is operable at a system voltage of 12 volts up to a maximum of 48 volts.

3. The apparatus as claimed in claim 1, wherein the heating element (1, 7) is operable at a system voltage above an onboard voltage in a vehicle operated with only a combustion engine.

4. The apparatus as claimed in claim 1, further comprising a shell (8) surrounding the honeycomb body (5), wherein, when viewed from the outside to the inside of the apparatus in the radial direction, the heating element (1, 7) has:
   a first region (2) in contact with the shell (8),
   a thermal insulating region (3), and
   a heating zone (4).

5. The apparatus as claimed in claim 1, further comprising an electrically heatable heating disk arranged ahead of the honeycomb body (5) in a flow direction of the exhaust gas.

6. The apparatus as claimed in claim 5, wherein the heating element (1, 7) in the honeycomb body (5) and the heating disk are heatable independently of one another.

7. The apparatus as claimed in claim 1, wherein the first portion of the plurality of metal foils stacked one on top of the other are deformed at least where they contact the at least one electric heating element (1, 7).

8. The apparatus as claimed in claim 7, wherein the first portion of the plurality of metal foils stacked one on top of the other are deformed in a direction of insertion of the at least at least one electric heating element (1, 7).

9. A method for heating the exhaust gas after-treatment unit, using the apparatus as claimed in claim 5, the method comprising heating the exhaust gas after-treatment unit by at least two different heating methods, wherein the respective heating method is selected according to the respective drive source being used to produce propulsion of the vehicle.

10. The method as claimed in claim 9, wherein, when the combustion engine is used as the drive source, the exhaust gas after-treatment unit is heated by the heating disk positioned ahead of the honeycomb body (5), wherein the exhaust gas stream flowing through the heating disk is heated by the heating disk, and the heated exhaust gas stream subsequently heats the honeycomb body (5).

11. The method as claimed in claim 10, wherein, when the electric motor is being used as the drive source, the exhaust gas after-treatment unit is heated by the heating element (1, 7) arranged in the hollow (6) of the honeycomb body (5).

12. The method as claimed in claim 11, wherein the heating element (1, 7) is heated with a voltage of approximately 230 volts or more, thereby achieving a power output of up to 300 watts, at current intensities of 1 to 1.5 amps.

13. The method as claimed in claim 11, wherein the heating of the honeycomb body (5) by the heating element (1, 7) takes place continuously for as long as the combustion engine is not being operated.

14. The method as claimed in claim 13, further comprising providing a controller configured to monitor the vehicle, which, the controller being further configured to, depending on the respectively active drive source and the instantaneous driving situation, produce a prediction of the type of drive selected in the future, wherein, in the event of an expected use of the combustion engine as the drive source, the heating of the honeycomb body (5) by the heating element (1, 7) is started.

15. The method as claimed as claimed in claim 13, further comprising preheating the heating element, wherein the preheating can be started by a timer or by an external control element, based on values acquired by a monitoring unit.

* * * * *